(12) United States Patent
Sakamoto

(10) Patent No.: US 10,232,883 B2
(45) Date of Patent: Mar. 19, 2019

(54) VEHICLE EQUIPPED WITH TRAVELING MOTOR

(71) Applicant: TOYOTA JIDOSHA KABUSHIKI KAISHA, Toyota-shi, Aichi-ken (JP)

(72) Inventor: Yusuke Sakamoto, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/477,459

(22) Filed: Apr. 3, 2017

(65) Prior Publication Data

US 2017/0291643 A1    Oct. 12, 2017

(30) Foreign Application Priority Data

Apr. 6, 2016   (JP) ................. 2016-076716

(51) Int. Cl.
| | | |
|---|---|---|
| B62D 21/15 | (2006.01) | |
| B60K 1/00 | (2006.01) | |
| B62D 25/08 | (2006.01) | |
| B60K 6/26 | (2007.10) | |
| B60K 11/04 | (2006.01) | |
| B60L 11/18 | (2006.01) | |
| B62D 25/04 | (2006.01) | |

(52) U.S. Cl.
CPC ............ B62D 21/152 (2013.01); B60K 1/00 (2013.01); B60K 6/26 (2013.01); B60K 11/04 (2013.01); B60L 11/1803 (2013.01); B62D 25/04 (2013.01); B62D 25/082 (2013.01); B60L 2210/40 (2013.01)

(58) Field of Classification Search
CPC . B60K 1/00; B60K 11/04; B60K 6/26; B62D 25/04; B62D 21/152
See application file for complete search history.

(56) References Cited

U.S. PATENT DOCUMENTS

| | | | | |
|---|---|---|---|---|
| 5,271,473 A | * | 12/1993 | Ikeda | .................... B60K 11/04 180/68.4 |
| 6,827,129 B2 | * | 12/2004 | Ozawa | .................. B60K 11/04 165/140 |

(Continued)

FOREIGN PATENT DOCUMENTS

| | | |
|---|---|---|
| CN | 101264770 A | 9/2008 |
| EP | 2 982 574 A1 | 2/2016 |

(Continued)

*Primary Examiner* — Frank B Vanaman
(74) *Attorney, Agent, or Firm* — Sughrue Mion, PLLC

(57) ABSTRACT

A vehicle equipped with a traveling motor includes: two front pillars; two side members; a power unit arranged between the two side members and including the traveling motor; an electric-power converter arranged adjacent to the power unit and located at a higher position in the vehicle-vertical direction than the side members; and a first auxiliary frame member, a first end of the first auxiliary frame member being coupled to one of the front pillars, the first auxiliary frame member extending, as viewed from the vehicle-width direction, to pass a position where the first auxiliary frame member overlaps with the electric-power converter or a position higher than the electric-power converter, and a second end of the first auxiliary frame member being coupled to one of the side members, at a more frontward position than the electric-power converter.

6 Claims, 4 Drawing Sheets

(56) References Cited

U.S. PATENT DOCUMENTS

| | | | |
|---|---|---|---|
| 2003/0025358 A1* | 2/2003 | Taguchi | B62D 21/152 296/203.02 |
| 2003/0089545 A1* | 5/2003 | Seksaria | B60K 5/12 180/312 |
| 2004/0090085 A1* | 5/2004 | Kawasaki | B60K 1/04 296/187.09 |
| 2004/0195020 A1* | 10/2004 | Suwa | B60K 11/04 180/68.4 |
| 2005/0077711 A1* | 4/2005 | Yasui | B62D 21/152 280/735 |
| 2006/0284449 A1 | 12/2006 | Miyahara | |
| 2007/0176443 A1* | 8/2007 | Yasuhara | B62D 21/152 293/133 |
| 2008/0150326 A1* | 6/2008 | Maruyama | B62D 25/082 296/192 |
| 2008/0224502 A1 | 9/2008 | Miki | |
| 2009/0140546 A1* | 6/2009 | Okabe | B60R 19/18 296/187.09 |
| 2012/0153679 A1* | 6/2012 | Yasuhara | B62D 21/152 296/203.02 |
| 2012/0256448 A1* | 10/2012 | Yasui | B62D 21/152 296/209 |
| 2013/0037335 A1* | 2/2013 | Sakamoto | H05K 5/0204 180/65.8 |
| 2013/0043087 A1 | 2/2013 | Mildner | |
| 2013/0248275 A1* | 9/2013 | Cunningham | B60K 1/00 180/299 |
| 2014/0345960 A1 | 11/2014 | Yamanaka et al. | |
| 2015/0097351 A1 | 4/2015 | Rosepiler et al. | |

FOREIGN PATENT DOCUMENTS

| | | |
|---|---|---|
| JP | 2003-118640 A | 4/2003 |
| JP | 2012-096746 A | 5/2012 |
| JP | 2012144227 A | 8/2012 |
| JP | 2013-233836 A | 11/2013 |
| JP | 2015067122 A | 4/2015 |
| WO | 2013038487 A1 | 3/2013 |

\* cited by examiner

VEHICLE EQUIPPED WITH TRAVELING MOTOR

INCORPORATION BY REFERENCE

The disclosure of Japanese Patent Application No. 2016-076716 filed on Apr. 6, 2016 including the specification, drawings and abstract is incorporated herein by reference in its entirety.

BACKGROUND

1. Technical Field

The present disclosure relates to a vehicle equipped with a traveling motor.

2. Description of Related Art

Examples of vehicles equipped with traveling motors include electric vehicles, hybrid vehicles, and fuel cell vehicles. Vehicles equipped with traveling motors include electric-power converters to convert electric power of electric power sources to driving electric power for the traveling motors. Travelling motors and electric-power converters are housed in front spaces (front compartments) of vehicles in some cases. Devices disposed in the front spaces of the vehicles might receive damage when the vehicles undergo forward collisions.

Electric-power converters handle high voltage; therefore, techniques to protect the electric-power converters from impact of collisions are disclosed in the related art. For example, as a safety countermeasure to a collision of an electric-power converter, Japanese Patent Application Publication No. 2012-96746 discloses a technique to fix an electric-power converter (inverter) between two side members (front side members) in a front space of a vehicle. The electric-power converter is protected by the two side members securing strength of the vehicle.

Meanwhile, for example, Japanese Patent Application Publication No. 2013-233836 discloses a structure in which, in a front space of a vehicle, a power unit including a traveling motor is disposed between two side members, and an electric-power converter is fixed on the power unit. If the electric-power converter is fixed on the power unit, an impact load (a load applied to a device in a collision) is first received by the side members, and then by a housing of the power unit. Therefore, damage to the electric-power converter caused by the collision is reduced.

SUMMARY

In the case of employing the structure of JP 2013-233836 A, if an obstacle colliding with the vehicle enters the front space at the same height as that of the side members, the side members and the power unit protect the electric-power converter, as aforementioned. However, according to the structure of JP 2013-233836 A, the electric-power converter is located at a higher position than the side members. For example, in the case in which an obstacle enters the front space at a higher position than the side members and the power unit, the obstacle may contact the electric-power converter. The present disclosure is directed to a vehicle including an electric-power converter fixed at a higher position than side members in a front space of the vehicle, and provides a technique to reduce damage applied to the electric-power converter when a collision occurs.

An aspect of the disclosure provides a vehicle equipped with a traveling motor. The vehicle according to the aspect of the present disclosure includes: two front pillars arranged on both sides of the vehicle in a vehicle-width direction in a front part of a cabin in a vehicle-longitudinal direction, each of the front pillars extending in a vehicle-vertical direction; a dash panel coupling the two front pillars to each other; two side members extending in the vehicle-longitudinal direction in a front space of the dash panel, the side members being coupled to the dash panel; a power unit arranged between the two side members, the power unit including the traveling motor; an electric-power converter arranged adjacent to the power unit, the electric-power converter located at a higher position in the vehicle-vertical direction than the side members, the electric-power converter being configured to convert electric power of an electric power source to driving electric power for the traveling motor; and a first auxiliary frame member, a first end of the first auxiliary frame member being coupled to one of the front pillars located closer to the electric-power converter than the other one of the front pillars is, the first auxiliary frame member extending in such a manner as to, as viewed from the vehicle-width direction, pass a position where the first auxiliary frame member overlaps with the electric-power converter or a position higher than the electric-power converter in the vehicle-vertical direction, and a second end of the first auxiliary frame member being coupled to one of the side members located closer to the electric-power converter than the other one of the side members is, at a more frontward position in the vehicle-longitudinal direction than the electric-power converter.

In the above aspect, the electric-power converter may be fixed on the power unit.

The vehicle according to the above aspect is configured such that an auxiliary frame member collides with an obstacle coming beyond side members and a power unit, thereby reducing damage applied to an electric-power converter.

The side members and the front pillars are rigid frame members securing strength of a front part of the vehicle. The side members and the front pillars are coupled to each other via a dash panel, and thus change in relative positional relation thereof in a collision is small. The auxiliary frame member is supported by the side member and the front pillar having the above configurations; therefore, the auxiliary frame member can be expected to have a smaller deformation in the collision, and exert a great resistance against an impact of the collision. The electric-power converter is protected by such an auxiliary frame member.

The auxiliary frame member extends more frontward than the electric-power converter, and thus the auxiliary frame member collides with the obstacle before the obstacle collides with the electric-power converter. Accordingly, power of the obstacle is reduced before the obstacle collides with the electric-power converter, thus effectively reducing damage applied to the electric-power converter.

In the above aspect, the first auxiliary frame member may extend in such a manner as to pass along the position where the first auxiliary frame member overlaps with the electric-power converter as viewed in the vehicle-width direction, and may extend along an upper surface of the electric-power converter as viewed from the vehicle-width direction.

According to the above configuration, against an obstacle colliding with an upper front end of the electric-power converter, the auxiliary frame member exerts a damage reduction effect to reduce damage applied to the electric-power converter. On the other hand, the auxiliary frame member does not extend through a space above the electric-power converter; therefore, it is unnecessary to enlarge the front space of the vehicle upward.

The vehicle according to the above aspect may include: a radiator core support provided at a more frontward position in the vehicle-longitudinal direction than the electric-power converter; and a radiator support upper, a first end of the radiator support upper being coupled to an upper part of the radiator core support, and a second end of the radiator support upper being coupled to the first auxiliary frame member.

The vehicle according to the above aspect may include a front cross member being coupled to front ends of the two side members in the vehicle-longitudinal direction, the front cross member extending in the vehicle-width direction. As viewed from the vehicle-width direction, the first auxiliary frame member may be located at a higher position in the vehicle-vertical direction than the front cross member, at a position of a front end of the electric-power converter in the vehicle-longitudinal direction.

In the above aspect, the auxiliary frame member may be provided on each of the right and the left as viewed from the front part of the vehicle. Specifically, the vehicle according to the above aspect may include a second auxiliary frame member, a first end of the second auxiliary frame member being coupled to one of the front pillars located farther from the electric-power converter than the other one of the front pillars is, the second auxiliary frame member extending in such a manner as to, as viewed from the vehicle-width direction, pass a position where the second auxiliary frame member overlaps with the electric-power converter or a position higher than the electric-power converter in the vehicle-vertical direction, and a second end of the second auxiliary frame member being coupled to one of the side members located farther from the electric-power converter than the other one of the side members is, at a more frontward position in the vehicle-longitudinal direction than the electric-power converter.

According to the above aspect, the auxiliary frame members are provided on both sides in the vehicle-width direction. Hence, the electric-power converter is protected from both an obstacle coming from the left front and an obstacle coming from the right front. Details and further improvements of the technique disclosed in the present specification will be described in the following "Detailed description of embodiments".

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Figure 1:
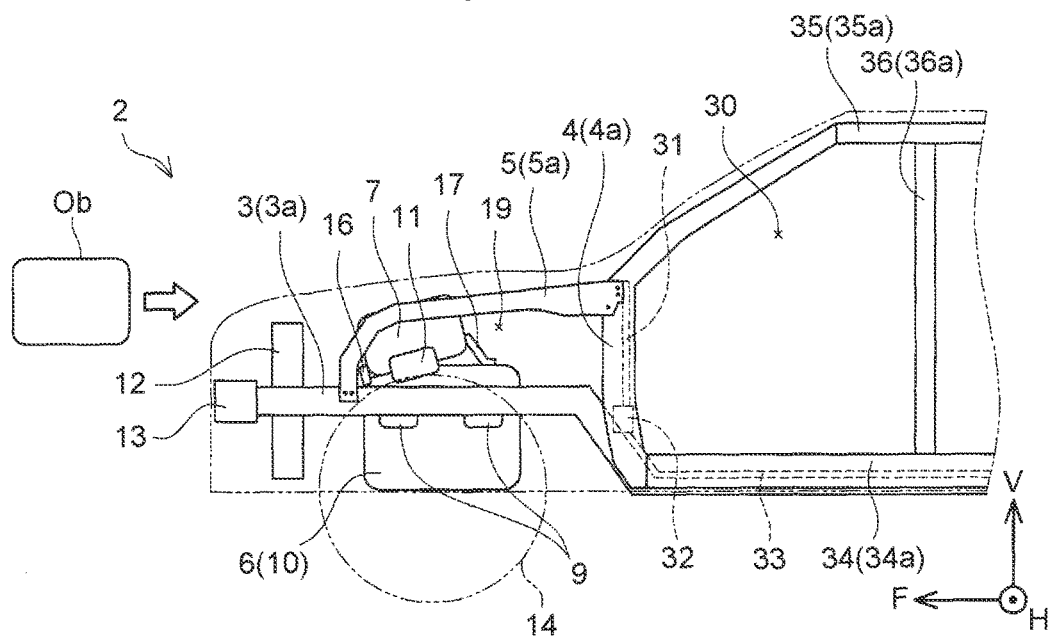
FIG. 1 is a side view showing a frame structure of a vehicle front part of a hybrid vehicle of an embodiment.
Figure 2:
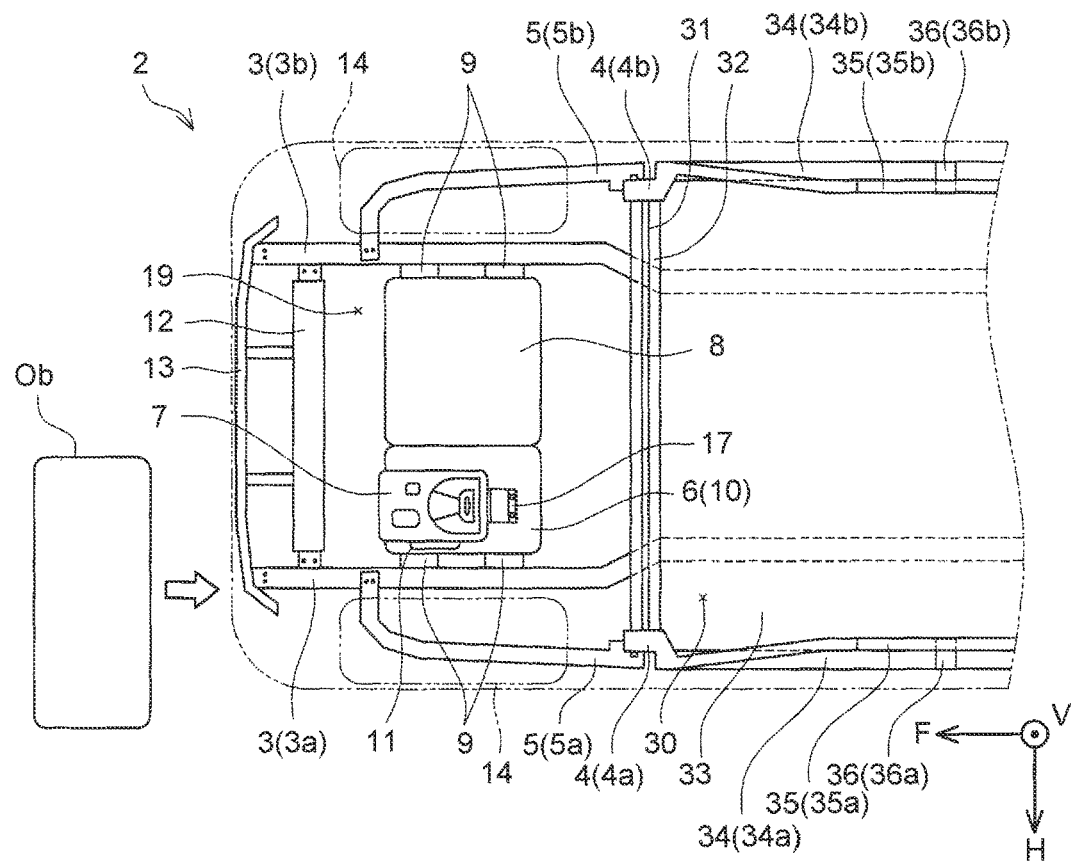
FIG. 2 is a plan view showing the frame structure of the vehicle front part of the hybrid vehicle of the embodiment.
Figure 3:
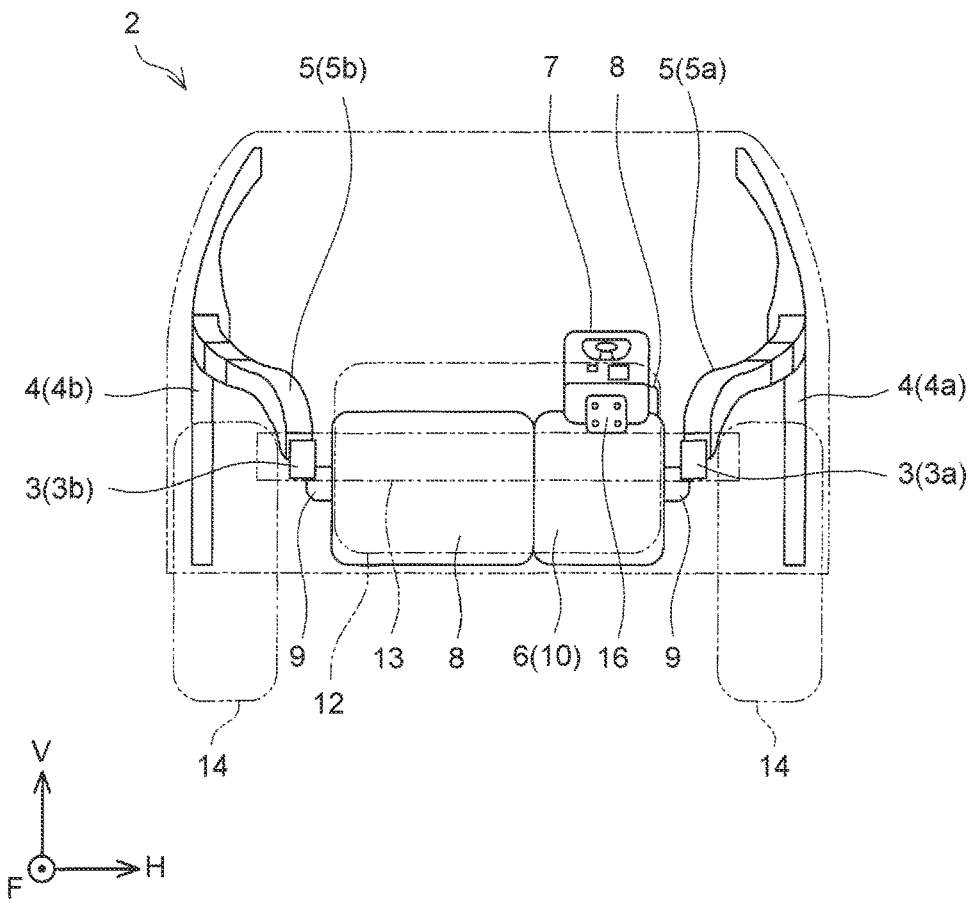
FIG. 3 is a front view showing the frame structure of the hybrid vehicle of the embodiment.

A vehicle of an embodiment will be described with reference to drawings. The vehicle of the embodiment is a hybrid vehicle 2 including an engine and a motor for vehicle traveling. FIG. 1 shows a side view of a vehicle front part of the hybrid vehicle 2, FIG. 2 shows a plan view of the vehicle front part, and FIG. 3 shows a front view thereof. In FIG. 1 to FIG. 3, an outer shape of a body is indicated by imaginary lines for easy understanding of a frame structure of the vehicle, and illustrations of some members such as side panels are omitted. In each of FIG. 1 to FIG. 3, in a front compartment 19, there are indicated an engine 8, a transaxle 6, and an electric-power converter 7 in addition to the frames, and illustrations of the other devices are omitted. For convenience of understanding, front wheels 14 are indicated by imaginary lines.

A coordinate system in each drawing will be described. In each coordinate system, a positive direction of an F-axis indicates a vehicle frontward direction, a positive direction of a V-axis indicates an upward direction, and an H-axis thereof indicates a vehicle-width direction.

The hybrid vehicle 2 of the embodiment includes the engine 8, the transaxle 6 including a traveling motor 10, and the electric-power converter 7 in the front compartment 19 (vehicle front space). Hereinafter, the traveling motor 10 is referred to simply as the motor 10 for simple description. The transaxle 6 includes a power distribution mechanism and a differential gear in addition to the motor 10 therein-side. The power distribution mechanism synthesizes an output torque of the engine 8 and an output torque of the motor 10, and transmits the synthesized torque to the differential gear. The power distribution mechanism can transmit part of the output torque of the engine 8 to the differential gear, and drive the motor 10 by the rest of the output torque. In this case, the motor 10 functions as an electric-power generator. Electric power generated by the motor 10 (regenerative electric power) is used for charging a not-shown high voltage battery. The transaxle 6 includes the motor 10, and thus the transaxle 6 may be deemed as a power unit.

The transaxle 6 is coupled to the engine 8 side by side in the vehicle-width direction. The transaxle 6 and the engine 8 are disposed to suspend between two side members 3 extending in a vehicle-longitudinal direction via engine mounts 9. The two side members 3 are a kind of frame members securing a structural strength of the vehicle. The left side member is indicated by a reference numeral 3a, and the right side member is indicated by a reference numeral 3b. If one of the two side members is represented without being distinguished from the other, or if both the side members are represented together, this is or they are appropriately referred to simply as the side member 3 or the side members 3.

The two side members 3 are coupled to each other via some cross members, such as a front cross member 13 and a dash cross member 32, and a dash panel 31. Both ends of a dash panel 31 and both ends of the dash cross member 32 are respectively coupled to two front pillars extending in a vertical direction at a front part and on both sides in the vehicle-width direction of a cabin 30. Specifically, the two side members 3 and the two front pillars 4 are coupled to each other via the dash panel 31 as well as the dash cross member 32. The dash panel 31 and the dash cross member 32 are located at a boundary between the front compartment 19 and the cabin 30 (vehicle interior). The left front pillar is indicated by a reference numeral 4a, and the right front pillar is indicated by a reference numeral 4b. If one of the two front pillars is represented without being distinguished from the other, or if both the front pillars are represented together, this is or they are referred to simply as the front pillar 4 or the front pillars 4. Each side member 3 extends from a vehicle front part (a coupling part where each front cross member 13 is coupled to the corresponding side member 3) toward a vehicle rearward direction, is bent downward in the vicinity of the dash cross member 32, and extends below a floor panel 33. A part of the side member 3 extending below the floor panel 33 might sometimes be referred to as an under reinforcement.

A roof side rail 35 extending in the vehicle-longitudinal direction is coupled to an upper end of each front pillar 4, and a lower side rail 34 extending in the vehicle-longitudinal direction is coupled to a lower end of each front pillar 4. Each roof side rail 35 is coupled to the corresponding lower side rail 34 via a corresponding center pillar 36. As with the side members 3 and the front pillars 4, each of the roof side rail 35, the lower side rail 34, and the center pillar 36 on the left is represented by using a reference numeral "a", and each of those members on the right is represented by using a reference numeral "b". If these right and left members are represented without being distinguished from each other, they are represented by using no reference numerals "a" and "b".

The side members 3, the front cross member 13, the dash cross member 32, the dash panel 31, the front pillars 4, the roof side rails 35, the lower side rails 34, the center pillars 36, and a not-shown rear cross member are frame members securing a structure strength of the vehicle. In particular, the side members 3, the front cross member 13, the dash cross member 32, and the front pillars 4 are frame members securing strength of the front part of the vehicle. The left front pillar 4a, the left roof side rail 35a, the left lower side rail 34a, and the left side pillar 36a configure an opening frame for a left front door; and the right front pillar 4b, the right roof side rail 35b, the right lower side rail 34b, and the right side pillar 36b configure an opening frame for a right front door. The respective opening frames for the right and the left front doors are coupled to each other via the dash cross member 32, the dash panel 31, and the floor panel 33. The opening frames for the right and the left front doors, the dash cross member 32, the dash panel 31, and the floor panel 33 also serve as frame members protecting the front part of the cabin 30 from a collision impact.

A radiator core support 12 is located immediately behind the front cross member 13. The radiator core support 12 is a frame member surrounding a radiator. In FIG. 3, the front cross member 13 and the radiator core support 12 are respectively indicated by imaginary lines so that the devices located behind them can be seen. In FIG. 3, illustrations of the dash cross member 32, the dash panel 31, the floor panel 33, the roof side rails 35, the lower side rails 34, and the center pillars 36 are omitted. Illustrations of parts of the side members 3 bent downward are omitted.

The electric-power converter 7 is fixed on the transaxle 6. The electric-power converter 7 is fixed on the transaxle 6 via a front bracket 16 and a rear bracket 17. The electric-power converter 7 converts an output electric power of the not-shown high-voltage battery to driving electric power for the motor 10, and supplies the converted electric power to the motor 10. Specifically, the electric-power converter 7 steps up the output electric power of the high-voltage battery, and then converts the output electric power to alternative current. If the motor 10 generates electric power, the electric-power converter 7 converts regenerative electric power generated by the motor 10 from alternating current to direct current, and then steps down the electric power, and supplies the electric power to the high-voltage battery. The electric-power 5 converter 7 is electrically connected to the transaxle 6 (motor 10 thereinside) via a power cable 11.

The following two advantages are obtained by disposing the electric-power converter 7 on the transaxle 6. One of the advantages is that a length of the power cable 11 between the electric-power converter 7 and the motor 10 can be reduced. The other of the advantages is that when the vehicle undergoes a forward collision, the side members 3 first accept part of an impact load, and the housing of the transaxle 6 then accepts the rest of the impact load unaccepted by the side members 3, thereby reducing damage applied to the electric-power converter 7. However, an upper surface of the transaxle 6 is located at a higher position than positions of the side members 3, and the electric-power converter 7 fixed on the transaxle 6 is also located at a higher position than the positions of the side members 3. Consequently, for example, in FIG. 1 and FIG. 2, as shown by a reference numeral Ob, if an obstacle at a higher position than the side members 3 and the transaxle 6 enters the vehicle front space, it is difficult to expect either of the side members 3 and the transaxle 6 to reduce the damage to the electric-power converter 7. In FIG. 1, the obstacle enters the vehicle front space at a higher position than that of the front cross member 13; thus it is also difficult to expect the front cross member 13 to reduce the damage to the electric-power converter 7. To cope with this, the hybrid vehicle 2 of the embodiment includes auxiliary frame members 5 extending from the front pillars 4, passing by both lateral sides of the electric-power converter 7 to the side members 3.

The hybrid vehicle 2 of the embodiment includes two auxiliary frame members, and one of them is arranged on the right and the other of them is arranged on the left. The left auxiliary frame member 5a extends from the front pillar (left front pillar 4a) to the side member (left side member 3a) on the vehicle left side, and the right auxiliary frame member 5b extends from the front pillar 4b to the side member 3b on the vehicle right side.

The left auxiliary frame member 5a will be described. The left auxiliary frame member 5a is coupled at one end (rear end) thereof to the left front pillar 4a, and extends frontward. The left auxiliary frame member 5a extends to pass by the lateral side of the electric-power converter 7, across a front edge of the electric-power converter 7 as viewed from a vehicle lateral direction, and then extending frontward of the electric-power converter 7. The "lateral side of the electric-power converter 7" denotes a lateral side of the electric-power converter 7 as viewed from the vehicle front. While extending by the lateral side of the electric-power converter 7, the left auxiliary frame member 5a is curved downward so that the other end (front end) thereof is coupled to the left side member 3a at a more frontward position than the electric-power converter 7.

In each of FIG. 1 and FIG. 2, the obstacle Ob is shown at a higher position than those of the side members 3 and the transaxle 6. If such an obstacle Ob enters the front compartment 19, the obstacle Ob does not collide with the side members 3 and the transaxle 6, but collides with the left auxiliary frame member 5a. The left auxiliary frame member 5a reduces damage applied to the electric-power converter 7 caused by the entering obstacle Ob. Particularly, the left auxiliary frame member 5a extends at a lower level than a substantial center in the vertical direction of the electric-power converter 7 to a more frontward position than the electric-power converter 7. Hence, the left auxiliary frame member 5a collides with an obstacle Ob entering at a lower height than the substantial center in the vertical direction of the electric-power converter 7 before the electric-power converter 7 collides with the obstacle Ob. Hence, power of the obstacle Ob is reduced before the obstacle Ob collides with the electric-power converter 7, thus reducing damage applied to the electric-power converter 7. For convenience of explanation, an expression that "the obstacle Ob enters the front compartment 19" is used, but the expression also includes an aspect that an obstacle Ob stands still, and the hybrid vehicle 2 advances and collides with the obstacle Ob.

As understood from FIG. 1, an upper surface of the left auxiliary frame member 5a generally extends along the upper surface of the electric-power converter 7 as viewed from the vehicle-width direction. Accordingly, the left auxiliary frame member 5a collides with an obstacle Ob that is to collide with the upper front part of the electric-power converter 7, thus reducing damage applied to the electric-power converter 7. The left auxiliary frame member 5a is configured not to extend at a higher level than the electric-power converter 7; thus no unnecessary space is required above the electric-power converter 7 in the front space of the hybrid vehicle 2.

The left auxiliary frame member 5a is coupled at a rear end thereof to the left front pillar 4a, extends in the vehicle frontward direction, and is coupled at a front end thereof to the left side member 3a. The left side member 3a is coupled to the left front pillar 4a via the dash panel 31. The left front pillar 4a and the left side member 3a are rigid frame members securing strength of the front part of the vehicle. Since the left front pillar 4a is coupled to the left side member 3a via the dash panel 31, these members are expected to have a smaller change in relative positional relation thereof even if they receive a collision impact. The left auxiliary frame member 5a is supported by the side members 3 and the front pillars 4 having a smaller change in relative positional relation thereof at the time of a collision. Accordingly, it is expected that, in a collision, both ends of the left auxiliary frame member 5a have a smaller relative change in positions thereof, and thus, deformation of the left auxiliary frame member 5a becomes smaller. With the aforementioned structure, the left auxiliary frame member 5a can be expected to have a great resistance against a collision impact. The electric-power converter 7 is protected by the left auxiliary frame member 5a having such a great resistance. In addition, the left auxiliary frame member 5a is coupled at the rear end thereof to the left front pillar 4a that is a member securing the strength of the vehicle, and extends frontward. With the structure, the left auxiliary frame member 5a exerts a great strength against an obstacle colliding from the front.

Of the two front pillars 4a, 4b located on both sides of the vehicle, the left front pillar 4a is a front pillar located closer to the electric-power converter 7. Of the two side members 3, the left side member 3a is a side member located closer to the electric-power converter 7. In the meantime, the hybrid vehicle 2 of the embodiment includes the right auxiliary frame member 5b having the same structure as that of the left auxiliary frame member 5a, on the right side of the vehicle. Specifically, the hybrid vehicle 2 includes the auxiliary frame members 5a, 5b, both having the same structure, on the right and the left of the vehicle. If there is provided at least the auxiliary frame member (left auxiliary frame member 5a) coupled between the front pillar (left front pillar 4a) and the side member (left side member 3a) that are located closer to the electric-power converter 7, it can be expected to exert effect to reduce damage to the electric-power converter 7 in a forward collision. In particular, the auxiliary frame member (left auxiliary frame member 5a) coupled between the front pillar (left front pillar 4a) and the side member (left side member 3a) that are located closer to the electric-power converter 7 exerts a damage reduction effect on a diagonal collision caused by an obstacle entering from a diagonally frontward direction where the electric-power converter 7 is disposed. In the case of providing the auxiliary frame members 5a, 5b on the right and the left of the vehicle, even if an obstacle is long in the vehicle-width direction, the auxiliary frame members 5a, 5b on both sides collide with the obstacle, thereby further reducing damage to the electric-power converter 7. The auxiliary frame member 5b is coupled at one end thereof to the front pillar 4b located farther from the electric-power converter 7, extends in such a manner as to pass by the lateral side of the electric-power converter 7, and is coupled at the other end thereof to the side member 3b located more frontward than the electric-power converter 7 and farther from the electric-power converter 7.

Figure 4:
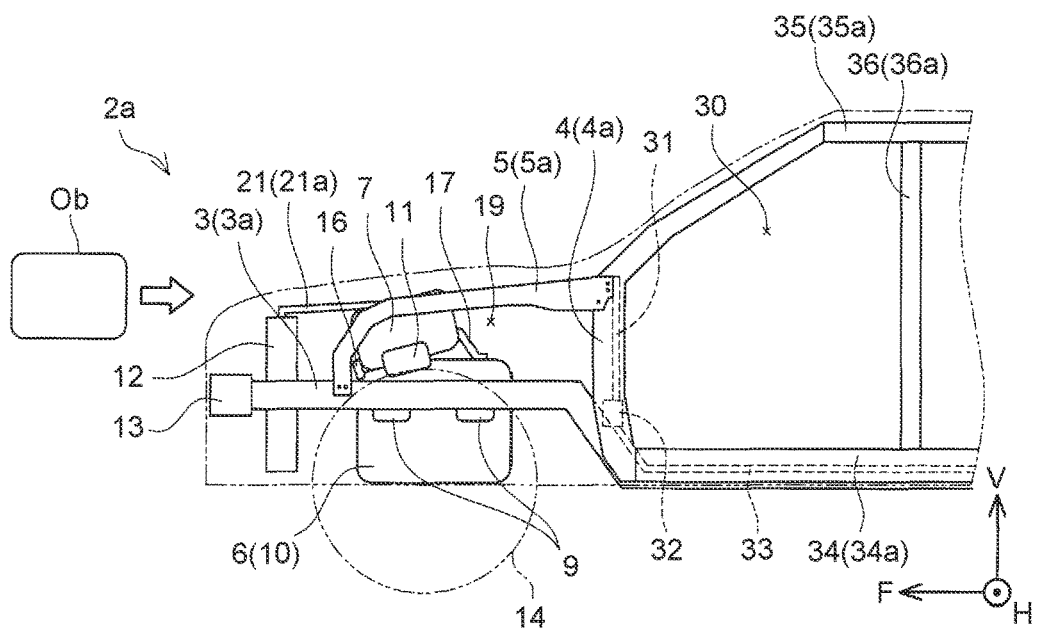
FIG. 4 is a side view showing a frame structure of a hybrid vehicle of a first variation.
Figure 5:
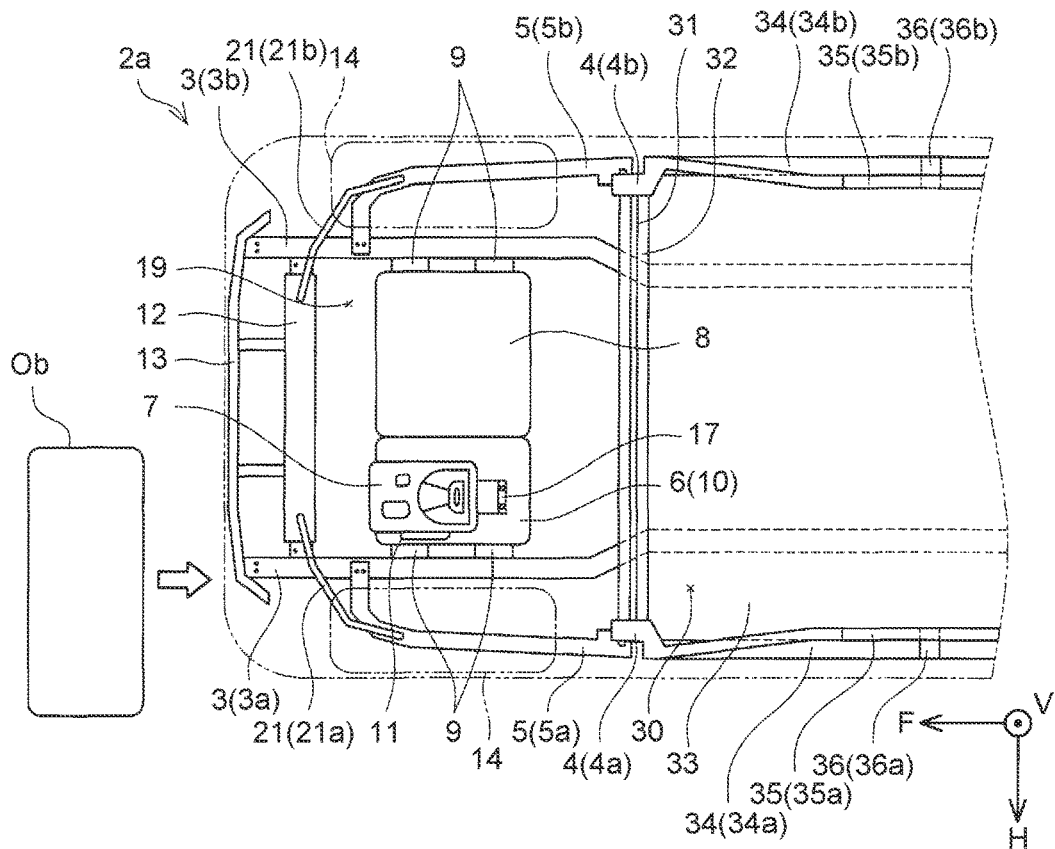
FIG. 5 is a plan view showing the frame structure of the hybrid vehicle of the first variation.

A hybrid vehicle 2a of a first variation will be described with reference to FIG. 4 and FIG. 5. FIG. 4 is a side view of a vehicle front part of the hybrid vehicle 2a, and FIG. 5 is a plan view of the vehicle front part of the hybrid vehicle 2a. The hybrid vehicle 2a of the present variation is different from the hybrid vehicle 2 of the embodiment in that radiator support uppers 21 are provided between the respective auxiliary frame members 5 and the radiator core support 12. In FIG. 4 and FIG. 5, the same reference numerals are used for the same components as the components as shown in FIG. 1 and FIG. 2.

A radiator support upper 21a is coupled at one end (front end) thereof to an upper left side of the radiator core support 12, and is coupled at the other end (rear end) thereof to a middle part of the left auxiliary frame member 5a. A radiator support upper 21b is coupled at one end (front end) thereof to an upper right side of the radiator core support 12, and is coupled at the other end (rear end) thereof to a middle part of the right auxiliary frame member 5b. The radiator support uppers 21 reinforce the radiator core support 12 (not-shown radiator). Note that the front ends of the radiator support uppers 21 may be coupled not to the radiator core support 12 but to a not-shown radiator.

Figure 6:
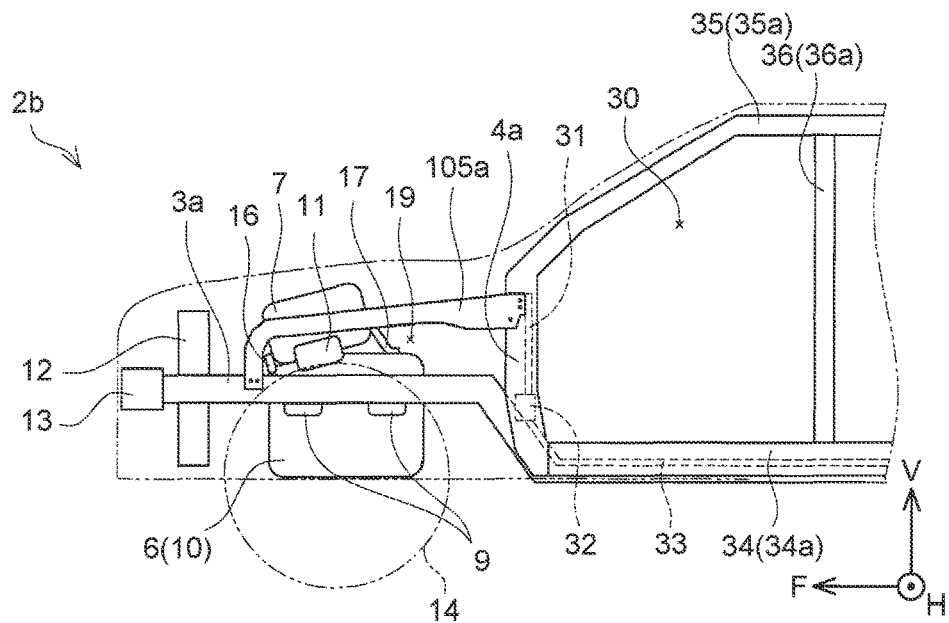
FIG. 6 is a side view showing a frame structure of a hybrid vehicle of a second variation.

A hybrid vehicle 2b of a second variation will be described with reference to FIG. 6. FIG. 6 is a side view of a vehicle front part of the hybrid vehicle 2b. The hybrid vehicle 2b is different from the aforementioned hybrid vehicle 2 in that positions where auxiliary frame members 105 extend are lower than those of the auxiliary frame members of the aforementioned hybrid vehicle 2. Reference numerals for some of the components in FIG. 6 which are the same as the components as shown in FIG. 1 are omitted.

A left auxiliary frame member 105a is coupled at one end (rear end) thereof to the left front pillar 4a, extends by the lateral side of the electric-power converter 7, and is coupled at the other end (front end) thereof to the left side member 3a at a more frontward position than the electric-power converter 7. The left auxiliary frame member 105a extends along the substantial center in the vertical direction of the electric-power converter 7 by the lateral side of the electric-power converter 7. With respect to this point, the left auxiliary frame member 105a is different from the left auxiliary frame member 5a extending along the upper surface of the electric-power converter 7 as viewed from the vehicle lateral direction. It is difficult to expect the hybrid vehicle 2b of the second variation to exert the great damage reduction effect on an obstacle colliding with the upper front part of the electric-power converter 7, but the hybrid vehicle 2b can be expected to exert a damage reduction effect on an obstacle colliding with a lower part than the center of the front surface of the electric-power converter 7. Although not shown in the drawings, the hybrid vehicle 2a is also equipped with an auxiliary frame member (right frame member 105b) having the same structure as that of the left auxiliary frame member.

A plan view of the hybrid vehicle 2b of the second variation is the same as the view of FIG. 2. Specifically, as viewed from above, the left auxiliary frame member 105a extends by the lateral side of the electric-power converter 7 (i.e., outward of the electric-power converter 7 in the vehicle-width direction).

Figure 7:
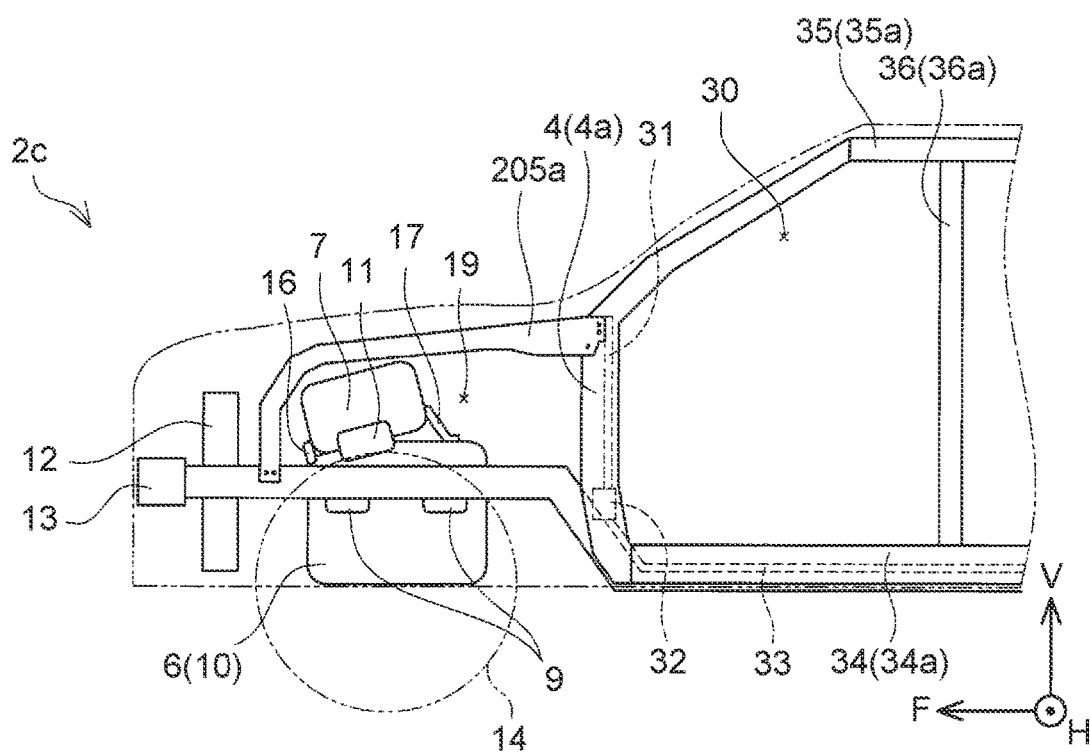
FIG. 7 is a side view showing a frame structure of a hybrid vehicle of a third variation.

A hybrid vehicle 2c of a third variation will be described with reference to FIG. 7. FIG. 7 is a side view of a vehicle front part of the hybrid vehicle 2c. The hybrid vehicle 2c is different from the aforementioned hybrid vehicle 2 in that positions where auxiliary frame members 205 extend are higher than those of the auxiliary frame members of the aforementioned hybrid vehicle 2. Reference numerals for some of the components in FIG. 7 which are the same as the components as shown in FIG. 1 are omitted.

A left auxiliary frame member 205a is coupled at one end (rear end) thereof to the left front pillar 4a, and is coupled at the other end (front end) thereof to the left side member 3a at a more frontward position than the electric-power converter 7. The left auxiliary frame member 205a extends to pass above the electric-power converter 7 as viewed from the vehicle lateral direction. With respect to this point, the left auxiliary frame member 205a is different from the left auxiliary frame member 5a of the embodiment that extends to pass by the lateral side of the electric-power converter 7. The left auxiliary frame member 205a of the hybrid vehicle 2c of the third variation can be expected to exert the damage reduction effect to reduce damage to the electric-power converter 7 caused by an obstacle entering beyond the side members 3 and the transaxle 6. In the hybrid vehicle 2c of the third variation, the left auxiliary frame member 205a extends at a higher level than the electric-power converter 7 as viewed from the vehicle lateral direction. Therefore, an aspect of the left auxiliary frame member 205a of the third variation is suitable to an vehicle having a spare height in the vehicle front space.

A plan view of the hybrid vehicle 2c of the third variation is the same as the view of FIG. 2. Specifically, as viewed from above, the left auxiliary frame member 205a extends by the lateral side of the electric-power converter 7.

As aforementioned, each hybrid vehicle of the embodiment and the variations is equipped with the auxiliary frame member (5a, 105a, 205a) that is coupled at one end thereof to the front pillar (left front pillar 4a) located closer to the electric-power converter 7, extends in such a manner as to pass above the electric-power converter 7 as viewed from the lateral direction of the electric-power converter 7 or the vehicle lateral direction, and is coupled at the other end thereof to the side member (left side member 3a) located frontward of the electric-power converter 7 and closer to the electric-power converter 7. The auxiliary frame member (5a, 105a, 205a) reduces damage to the electric-power converter caused by an obstacle entering beyond the side members 3 and the transaxle 6. Each hybrid vehicle of the embodiment and the variations is equipped with the auxiliary frame member (5b, 105b, 205b) that is coupled at one end thereof to the front pillar (right front pillar 4b) located farther from the electric-power converter 7, extends in such a manner as to pass above the electric-power converter 7 as viewed from the lateral direction of the electric-power converter 7 or the vehicle lateral direction, and is coupled at the other end to the side member (right side member 3b) located frontward of the electric-power converter 7 and farther from the electric-power converter 7.

Remarks with respect to the technique described in the embodiment will be explained. The transaxle 6 of the embodiment houses the traveling motor 10, and thus the transaxle 6 may be deemed as a power unit.

Each of the hybrid vehicle 2 of the embodiment and the hybrid vehicles 2a to 2c of the variations is equipped with the auxiliary frame members on the right and left of the vehicle. The auxiliary frame member may be provided at least on the side located closer to the electric-power converter. The auxiliary frame members contribute to reduction of damage applied to the electric-power converter when an obstacle enters the front compartment at a higher position than the side members and the transaxle in a forward collision or a diagonally forward collision. Of course, the auxiliary frame members also contribute to reduction of damage applied to the electric-power converter if a part of an obstacle having entered at an equal height to a height of the side members or the transaxle comes beyond the transaxle toward the electric-power converter.

The technique explained in the embodiment is suitably applicable not only to a hybrid vehicle but also to an electric vehicle and a fuel cell vehicle.

As aforementioned, specific examples of the present disclosure have been described in details, but they are merely explications, and the present disclosure is not limited to them. The present disclosure includes various deformations and changes of the above described specific examples. For example, in the above embodiment and variations, the electric-power converter is fixed on the transaxle, but the electric-power converter and the transaxle may be arranged side by side in the vehicle-longitudinal direction or in the vehicle-width direction. The technique exemplified in the present specification and the drawings is capable of simultaneously achieving a plurality of objects, whereby achieving one of such objects offers technical utility.

What is claimed is:

1. A vehicle equipped with a traveling motor, the vehicle comprising:
    two front pillars arranged on both sides of the vehicle in a vehicle-width direction in a front part of a cabin in a vehicle-longitudinal direction, each of the front pillars extending in a vehicle-vertical direction;
    a dash panel coupling the two front pillars to each other;
    two side members extending in the vehicle-longitudinal direction in a front space of the dash panel, the side members being coupled to the dash panel;
    a power unit arranged between the two side members, the power unit including the traveling motor;
    an electric-power converter arranged adjacent to the power unit, the electric-power converter located at a higher position in the vehicle-vertical direction than the side members, the electric-power converter being configured to convert electric power of an electric power source to driving electric power for the traveling motor;
    a first auxiliary frame member, a first end of the first auxiliary frame member being coupled to one of the front pillars located closer to the electric-power converter than the other one of the front pillars, the first auxiliary frame member extending past the electric-power converter in the vehicle-longitudinal direction, and having a second end being coupled to one of the side members located closer to the electric-power converter than the other one of the side members, at a more frontward position in the vehicle-longitudinal direction than the electric-power converter, the first auxiliary frame member having at least a portion between the first end and the second end thereof positioned at the same height as, or higher than the electric-power converter in the vehicle-vertical direction;

a radiator core support provided at a more frontward position in the vehicle-longitudinal direction than the electric-power converter; and a radiator support upper, a first end of the radiator support upper being coupled to an upper part of the radiator core support, and a second end of the radiator support upper being coupled to the first auxiliary frame member, wherein the first auxiliary frame member connects to at least one of the side members from an outer side of the at least one of the side members in the vehicle-width direction.

2. The vehicle according to claim 1, wherein the electric-power converter is fixed on the power unit.

3. The vehicle according to claim 1, wherein the first auxiliary frame member overlaps with the electric-power converter as viewed in the vehicle-width direction, and extends along an upper surface of the electric-power converter as viewed from the vehicle-width direction.

4. The vehicle according to claim 1, further comprising:

a front cross member being coupled to front ends of the two side members in the vehicle-longitudinal direction, the front cross member extending in the vehicle-width direction, wherein as viewed from the vehicle-width direction, the first auxiliary frame member is located at a higher position in the vehicle-vertical direction than the front cross member, at a position of a front end of the electric-power converter in the vehicle-longitudinal direction.

5. The vehicle according to claim 1, further comprising a second auxiliary frame member, a first end of the second auxiliary frame member being coupled to one of the front pillars located farther from the electric-power converter than the other one of the front pillars is, the second auxiliary frame member extending in such a manner as to, as viewed from the vehicle-width direction, pass a position where the second auxiliary frame member overlaps with the electric-power converter or a position higher than the electric-power converter in the vehicle-vertical direction, and a second end of the second auxiliary frame member being coupled to one of the side members located farther from the electric-power converter than the other one of the side members is, at a more frontward position in the vehicle-longitudinal direction than the electric-power converter.

6. The vehicle according to claim 1, wherein the radiator core support is connected to the side members through a connecting member.

* * * * *